(12) United States Patent
Kotulla et al.

(10) Patent No.: US 7,040,631 B2
(45) Date of Patent: May 9, 2006

(54) HYDRAULIC SUSPENSION SYSTEM FOR A VEHICLE

(75) Inventors: Marcus Kotulla, Wilga (AU); Richard Monk, Busselton (AU)

(73) Assignee: Kinetic Pty. Ltd., Dunsborough (AU)

( * ) Notice: Subject to any disclaimer, the term of this patent is extended or adjusted under 35 U.S.C. 154(b) by 215 days.

(21) Appl. No.: 10/344,462

(22) PCT Filed: Aug. 13, 2001

(86) PCT No.: PCT/AU01/00991

§ 371 (c)(1),
(2), (4) Date: Aug. 18, 2003

(87) PCT Pub. No.: WO02/14094

PCT Pub. Date: Feb. 21, 2002

(65) Prior Publication Data

US 2004/0036244 A1 Feb. 26, 2004

(30) Foreign Application Priority Data

Aug. 11, 2000 (AU) .................................... PQ9346

(51) Int. Cl.
*B60G 17/04* (2006.01)
(52) U.S. Cl. ............................. 280/5.507; 280/124.116; 280/124.128; 280/124.159
(58) Field of Classification Search ......... 280/124.104, 280/124.106, 124.116, 124.128, 683, 124.158, 280/124.159, 124.157, 5.506, 5.507
See application file for complete search history.

(56) References Cited

U.S. PATENT DOCUMENTS 3,194,581 A * 7/1965 Brueder .................... 280/6.157

(Continued)

FOREIGN PATENT DOCUMENTS

FR 2700501 7/1994

OTHER PUBLICATIONS

Derwent Abstract Accession No. K 0128X/41, Class Q12, SU 498187 A (GUSAROVA) Mar. 30, 1976.

(Continued)

*Primary Examiner*—Eric Culbreth
(74) *Attorney, Agent, or Firm*—Harness, Dickey & Pierce, PLC

(57) ABSTRACT

A suspension system for a vehicle having at least one pair of forward and one pair of rearward wheels, including: a suspension arm (7–10) for each wheel providing at least partial location of the associated wheel, the suspension arm (7–8) of the forward wheel being pivotally mounted to a vehicle body at a pivot position (11, 15, 12, 16) rearward to an axle line of the forward wheel, the suspension arm (9–10) of the rearward wheel being pivotally mounted to the vehicle body at a pivot position (13, 17; 14, 18) forward to an axle line of the rearward wheel; at least one lever arm (19–22) moving in conjunction with and extending radially from the pivot position (11–18) of each suspension arm (7–10); wherein at each respective side of the vehicle, a ram assembly (23, 24) is located between the lever arms (19–22) of the forward and rearward wheel, the ram assembly (23, 24) including at least a first (25, 27) and second (26, 28) variable volume fluid chamber, each fluid chamber (25–28) being in fluid communication with a fluid chamber (25–28) of an opposing ram assembly (23, 24) provided on the opposing side of the vehicle, such that there is fluid flow between the chambers (25–28) of the ram assemblies (23, 24) during heave motion of the vehicle, there is little to no fluid flow between the chambers (25–28) of the ram assemblies (23, 24) during roll motions, and there is an at least substantially longitudinal motion of the ram assemblies (23, 24) with little to no flow of fluid between the chambers (25–28) or the ram assemblies (23, 24) during cross axle articulations motion of the wheels.

11 Claims, 6 Drawing Sheets

U.S. PATENT DOCUMENTS 3,298,709 A * 1/1967 Mercier ............... 280/124.157

5,447,332 A * 9/1995 Heyring ............... 280/124.104

5,480,188 A * 1/1996 Heyring ............... 280/124.104

5,601,306 A * 2/1997 Heyring .................. 280/5.508

OTHER PUBLICATIONS

Derwent Abstract Accession No. 98-392750/34, Class Q12, JP 10157430 A (Hino Motors Ltd) Jun. 16, 1998.

International Search Report—PCT/AU01/00991; ISA/Australian Patent Office; Date Completed: Sep. 17, 2001.

* cited by examiner

HYDRAULIC SUSPENSION SYSTEM FOR A VEHICLE

FIELD OF THE INVENTION

The present invention is generally directed to vehicle suspension systems, and in particular to roll control by such suspension systems. The present invention is applicable for, and will be described with respect to vehicles halving tandem axles or vehicles incorporating leading and/or trailing arm suspension systems. It should however be appreciated that the present invention is also applicable for use in other suspension applications.

BACKGROUND OF THE INVENTION

Trailers used in road trains are typically provided with a relatively simple suspension system. These trailers are typically provided with tandem axles, with each axle being located by means of a trailing or leading arm in conjunction with a Panhard rod or other means for providing lateral location of the axle. Air springs are typically used to provide the load support for the trailer.

While such a suspension arrangement is adequate for most on-road conditions, it would nevertheless be preferable that the trailer be also provided with additional roll support to minimize the roll motion of the trailer. Furthermore, it would be preferable that the wheel assemblies of the trailer be adapted to have relatively free cross-axle articulation motion (also called "warp" motion) where the trailer needs to go over uneven road or off-road surfaces. This will enable the trailer to more safely traverse such uneven surfaces and reduce the loading of a wheel riding up a curb.

The Applicant has developed a number of different hydraulic suspension systems that provide for roll support while at the same time allowing free cross-axle articulation of the wheel assemblies of the vehicles. These suspension systems are for example described in U.S. Pat. Nos. 5,447,332, 5,480,188, 5,562,305, 5,915,701 and 6,010,139. Such systems are however impractical to use on the tandem axles of trailers because of their complexity and cost.

It would however still be advantageous to use a hydraulic or pneumatic suspension arrangement for such tandem axle applications because such an arrangement can be readily retrofitted onto existing suspension systems.

It is therefore an object of the present invention to provide a suspension arrangement which is relatively simple in design, which provides improved roll control while at the same time allowing free cross-axle articulation motion of the wheel assemblies of a vehicle.

BRIEF SUMMARY OF THE INVENTION

With this in mind, there is provided a suspension system for a vehicle having a body and at least one pair of forward wheel assemblies and one pair of rearward wheels wheel assemblies, each wheel assembly including at least one wheel, the suspension system including:

a suspension arm for each wheel assembly providing at least partial location of the respective wheel assembly, the suspension arm of each forward wheel assembly being pivotally mounted to the vehicle body at a pivot position rearward of an axle line of the respective forward wheel assemblies, the suspension arm of each rearward wheel assembly being pivotally mounted 15 to the vehicle body at a pivot position forward of an axle line of the respective rearward wheel assemblies;

at least one lever arm moving in conjunction with and extending radially from the pivot position of each said suspension arm;

wherein at each side of the vehicle, a ram assembly is located between the lever arms of the respective forward and rearward wheel assemblies, each ram assembly including at least a first and second variable volume fluid chamber, each fluid chamber being in fluid communication with a fluid chamber of an opposing ram assembly provided on an opposing side of the vehicle, such that there is fluid flow between the chambers of the ram assembly during heave motion of the vehicle, there is little to no fluid flow between the chambers of the ram assembly during roll motions, and there is an at least substantially longitudinal motion of the ram assembly with little to no flow of fluid between the chambers of the ram assembly during cross axle articulation motion of the wheel assemblies.

The suspension system may use hydraulic fluid, although it is to be appreciated that a partial or completely pneumatic arrangement is also envisaged.

The or each ram assembly may include a single double acting ram having a cylinder separated into said first and second fluid chambers by a piston located therein. The lever arm of one of the wheel assemblies may be interconnected with the cylinder, the lever arm of the other wheel assembly on the same vehicle side being interconnected with the piston. Therefore, motion of the lever arms relative to each other results in movement of the piston within the cylinder. This results in a change of volume of the first and second fluid chambers of that double acting ram.

According to one preferred embodiment of the present invention, the lever arms on one vehicle side may extend in a generally upward direction, while the lever arms on the opposing vehicle side may extend in a generally downward direction. The first fluid chamber of the double acting rams on each side of the vehicle may be in fluid communication, and the second fluid chambers of said two double acting rams may also be in fluid communication.

The fluid chambers of each double acting ram preferably have at least substantially equal effective areas, being the area of each of the two faces of a respective piston. If the effective areas are equal, the pressure generated in roll within the double acting ram are more uniform and even such that the suspension system may operated in a symmetrical manner with little to no differences in the operation of opposing sides of the system. The effective areas may not be substantially different if the piston rod diameter is significantly smaller than the diameter of the piston. The cross-sectional area of the rod is then not large enough to significantly influence the effective area of the associated piston face. Alternatively, a through rod may be provided within the fluid chamber that is not accommodating the piston rod. This through rod may extend from the opposing piston face opposite the piston rod, and the diameter of the through rod may be at least substantially identical to the piston rod. This results in an at least substantial equalisation of the effective areas of each fluid chamber of the double acting ram.

According to another preferred embodiment of the present invention, the lever arms on both sides of the vehicle may extend in the same general upward or downward direction. The first fluid chamber of each said double acting ram may be in fluid communication with the second fluid chamber of the opposing double acting ram. This arrangement would operate most effectively where the fluid chamber effective areas of each double acting ram are at least substantially equalised. It should be noted that the arrangement where the lever arms on each side of the vehicle extend in generally opposing directions, it is possible to utilize double acting rams having unequal effective areas, although it is preferred that the acting rams on each side of the vehicle have the same effective areas.

When the lever arms on both sides of the vehicle extend in the same general upward or downward direction, the sense of operation from one ram assembly means to the other needs to be reversed to accomplish the same result of roll control with no warp stiffness and little or no heave stiffness. The connection sequence simply needs to be changed to reverse the operation of one ram assembly means such that the first fluid chamber of each ram assembly means is connected to the second fluid chamber of the ram assembly means on the opposite side of the vehicle.

Having the lever arms extending in the same general direction facilitates packaging of the suspension system. For example, to protect the hydraulic components from damage in severe operating conditions, the lever arms may extend generally upwardly to raise the ram assembly means from the ground. Alternatively, the lever arms can extend generally downwardly as dictated by packaging or other design considerations.

Both of the above lever arm positions and connection sequences allow the suspension system according to the present invention to operate to-provide for roll control for the vehicle while at the same time allowing free cross axle articulation motion of the wheels.

The use of double acting rams as the ram assembly means minimizes the space required under a vehicle to accommodate the suspension system. It is however also envisaged that alternative ram assembly means arrangements could be used. For example, to reduce the overall width of package required on each side of the vehicle, the ram assembly means may include a pair of single-acting roll control rams. The lever arms on both sides of the vehicle may extend in both the upward and downwards directions. On each side, one upper single-acting roll control ram may be located between the upwards extending lever arms of the forward and rearward wheels, and one lower single-acting roll control ram may be located between the downwards extending lever arms of the forward and rearward wheels. The upper single-acting roll control ram on one side of the vehicle may include a first fluid chamber and the lower single-acting roll control ram on the same side of the vehicle may include a second fluid chamber. On the opposite side of the vehicle the upper single-acting roll control ram may include a second fluid chamber and the lower single-acting roll control ram on the same side of the vehicle may include a first fluid chamber. The first fluid chamber of the ram assembly on one side of the vehicle may be connected to the first fluid chamber on the opposite side of the vehicle and the second fluid chamber of the ram assembly on one side of the vehicle may be connected to the second fluid chamber on the opposite side of the vehicle.

It is alternatively envisaged that the ram assembly means may include a series of interconnected rams providing increased functionality of partial or complete support. In a further possible arrangement, the ram assembly means may include a pair of single acting support rams, each single acting ram including a cylinder and piston supported therein and respectively providing third and fourth fluid chambers. A double acting ram including the first and second fluid chambers may be located between the single acting rams and may interconnect the respective pistons or cylinders of the single acting rams. The piston or cylinders of the two single acting rams may be respectively interconnected to the piston and cylinder of the intermediate ram. This arrangement may be connected in the following sequence. In a suspension arrangement where the lever arms on both sides of the vehicle extend in the same general direction, then the third and fourth fluid chambers provided by the single acting rams of one said ram assembly may be respectively in fluid communication with the third and fourth fluid chambers of the single acting rams of the opposing said ram assembly, and the first chamber of each said intermediate ram may be in fluid communication with the second chamber of the opposing intermediate ram. The connection sequence of the intermediate rams would be reversed if the lever arms on each side of the vehicle extend in generally opposite directions. More specifically, the first fluid chambers would be in fluid communication, and the second fluid chambers would be in fluid communication in the pair of intermediate rams. In the arrangement described above, the communicating double acting rams of the ram assembly means may act to provide the heave and roll stiffness of the suspension system. The communicating single acting rams of the ram assembly means may however act to provide at least a degree of support for the weight of the vehicle. The communicating single acting rams may also provide a degree of pitch support for the vehicle.

In yet another preferred embodiment of the present invention, which is a further modification of the previously described suspension system, the double acting ram and the pair of single acting rams of each ram assembly means may be integrated into a single unit. The ram assembly means may include a single piston cylinder accommodating a pair of pistons, each piston having a piston rod extending therefrom. The piston cylinder may then be separated into three fluid chambers, being a central fluid chamber, and side fluid chambers on opposite sides of the central fluid chamber. The central chamber may correspond to the first or second chamber of the previously described arrangement, and the side chambers correspond to the opposing said second or first chamber. Rod cylinders may also be provided on opposing sides of the piston cylinder, each rod chamber accommodating a piston rod. Each rod cylinder may provide a rod fluid chamber, the volume of which varies depending on the length of the piston rod accommodated therein at any particular time. The pistons of each ram assembly means may be respectively interconnected with the lever arms of a forward and a rearward wheel. The rod chambers correspond to the third and fourth chambers of the previously described arrangement.

The following connection sequence may be used for this arrangement when the lever arms are extending in the same general direction. The central fluid chamber of one ram assembly means may be in fluid communication with the side fluid chambers of the other ram assembly means on the other side of the vehicle. Furthermore, the rod fluid chambers of each ram assembly means associated with the forward wheels may be in fluid communication. Similarly, the rod fluid chambers associated with the rearward wheels may be in fluid communication. This arrangement therefore operates in the same way as the previously described arrangement, with the communicating central and side chambers providing the heave and roll stiffness for the suspension system, while the communicating rod chambers provide at least a degree of support for the vehicle.

In all of the above preferred embodiments, the fluid chambers may be connected by fluid conduits such as hydraulic lines to provide the fluid communication therebetween. Fluid accumulators may be provided in one or more of these fluid conduits to provide roll resilience for the vehicle. It is to be appreciated that other communication means are also envisaged. For example, if the ram assembly means are manufactured as a single unit having a common block, the fluid communication may be provided by passages passing through the common block. Fluid accumulators can then be mounted on that common block.

Although accumulators can be used to provide the roll resilience, it is to be appreciated that the roll resilience can also be provided by any of the following: mechanical deflection of the suspension arms and/or lever arms, bearing deflection or bushing stiffness in any of the bearings or bushings interconnecting the vehicle suspension system, fluid compressibility and fluid line expansion.

Such suspension and lever arms are used in existing trailing and leading arm vehicle suspension systems and in suspension systems associated with the tandem axles of road train trailers. The suspension system according to the present invention can be readily retrofitted into such vehicles. It is of course also envisaged that vehicles be produced having a suspension system according to the present invention.

The suspension system according to the present invention allows vehicles having trailing and leading arm suspensions to be readily adapted to improve roll control for the vehicle while at the same time allowing free cross axle articulation of the wheels of the vehicle.

It will be convenient to further describe the invention with respect to the accompanying drawings which illustrate preferred embodiments of the suspension system of the present invention. Other arrangements of the present invention are possible, and consequently, the particularity of the accompanying drawings is not to be understood as superseding the generality of the preceding description of the invention.

DETAILED DESCRIPTION OF THE INVENTION

Figure 1:
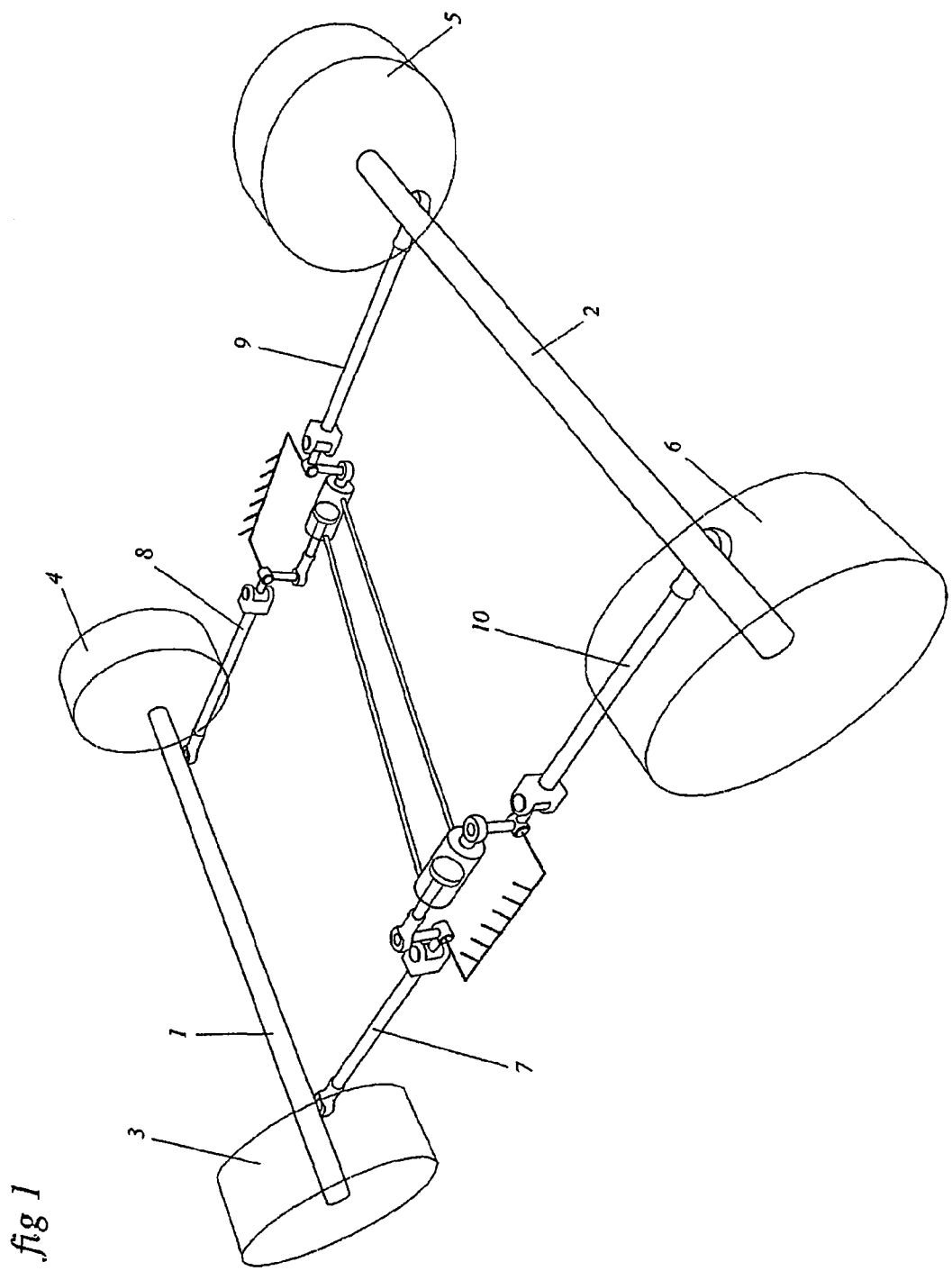
FIG. 1 is a schematic view of a tandem axle trailer wheel configuration showing a first preferred embodiment of the vehicle suspension system according to the present invention.
Figure 2:
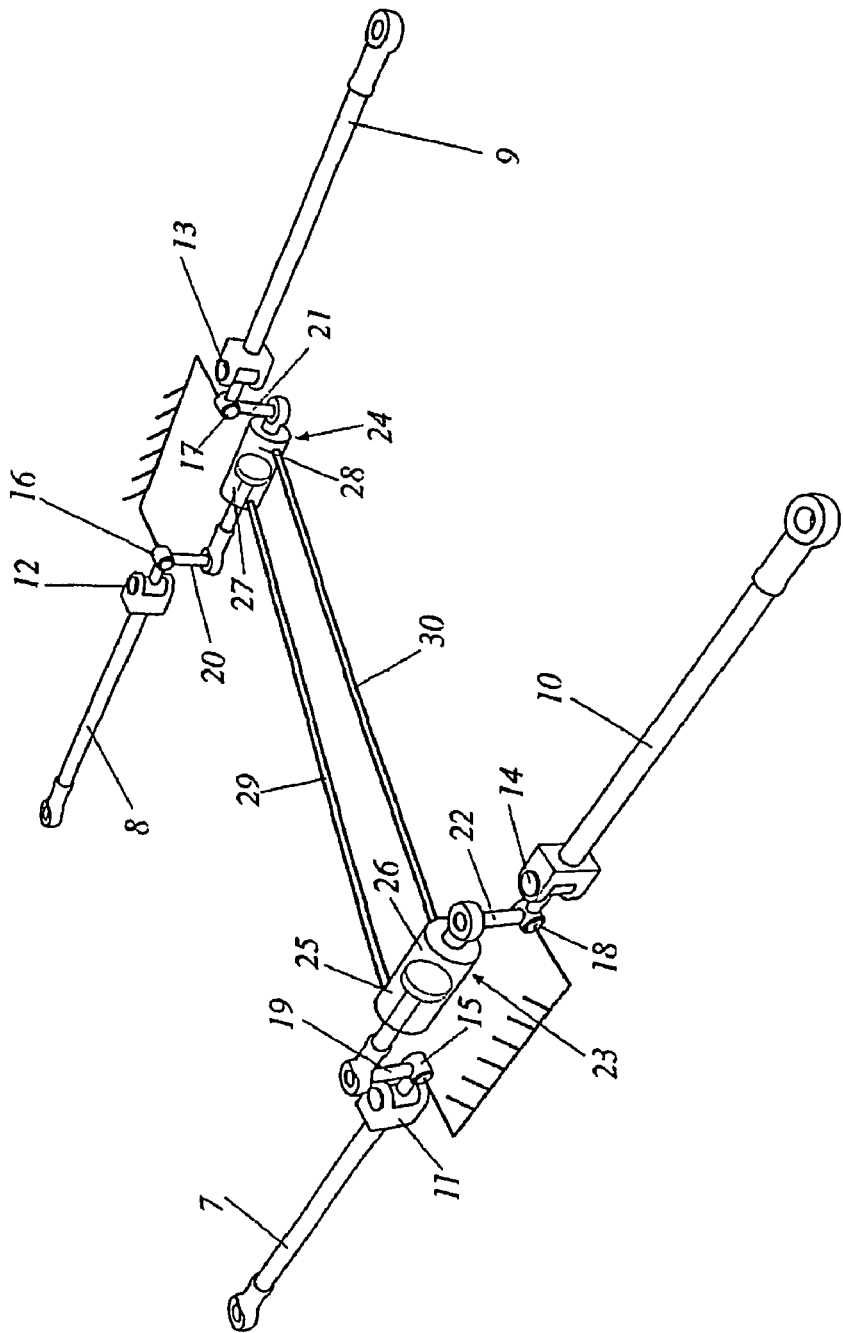
FIG. 2 is a schematic detail view of the vehicle suspension system of FIG. 1.

Referring initially to FIGS. 1 and 2, the tandem axle trailer wheel configuration includes a forward axle 1 having one or more wheels 3,4 mounted at each end. The axle 1 is attached to the body of the vehicle (not shown) by one leading arm 7,8 at each side thereof and may also have additional links (not shown) such as an upper A-frame to securely locate the axle 1 laterally, react brake torque, and control the wheel envelope. Each leading arm 7, 8, has bearings 11, 12 to permit lateral motion, relative to the vehicle body, of the end of the arm 7,8 which is attached to the forward axle 1. Each leading arm 7,8, also has a substantially laterally aligned bearing 15, 16, to permit vertical motion of the axle end relative to the vehicle body. Although these bearings are illustrated separately, the effective centre point of each bearing for one arm, ie bearing 11, 15 may be coincidental—at the same point, such as in the spider of a universal joint.

A lever arm 19, 20 extends from the bearing 15, 16, approximately perpendicular to the leading arms 7, 8. While both lever arms 19,20 are substantially vertical at ride height, the lever arm 19 on one side of the vehicle extends generally upwards, while the lever arm 20 on the opposite side of the vehicle extends generally downwards.

The rearward axle arrangement is a mirror of the front, about a vertical plane across the trailer. Therefore the rearward axle 2 has wheels 5,6 mounted at each end. The axle 2 is however attached to the body of the vehicle (not shown) by one trailing arm 9,10 on each side and may similarly have additional links (not shown) such as an upper A-frame to securely locate the axle laterally, react brake torque, and control the wheel envelope. Each trailing arm 9, 10, has bearings 13, 14 to permit lateral motions, relative to the vehicle body, of the end of the arm, which is attached to the rearward axle 2. Each trailing arm 9,10 also has a substantially laterally aligned bearing 17, 18, to permit vertical motion of the axle end relative to the vehicle body. Once again, it should be noted that although these bearings are illustrated separately, the effective centre point of each bearing for one arm, i.e. bearing 13, 17 may be coincidental—at the same point, such as in the spider of a universal joint.

A lever arm 21, 22 extends from the bearing 17, 18, approximately perpendicular to the trailing arms 9,10. While both lever arms 21,22 are substantially vertical at ride height, the lever arm 22 on one side of the vehicle extends generally upwards, while the lever arm 21 on the opposite side of the vehicle extends generally downwards.

Between the two axle arrangements are located two ram assembly means 23,24 the ram assembly means 23 on the left side of the vehicle interconnecting the lever arms 19 and 22, and the ram assembly means 24 on the right side of the vehicle interconnecting the cylinder lever arms 20 and 21. The ram assembly means 23,24 are in the form of double-acting rams. Each ram assembly means 23,24 has a first chamber 25, 27 and a second chamber 26, 28. The chambers are connected from the left to the right side of the vehicle by conduits 29, 30, the first conduit 29 providing communication between the first chambers 25, 27 of the ram assembly means 23, 24, and the second conduit 30 providing communication between the second chambers 26, 28 of the ram assembly means 23, 24.

With this above described arrangement, as the vehicle wheels move with respect to the body in the basic suspension modes of heave, roll, pitch and warp, the suspension system reacts differently, thereby providing passive suspension mode differentiation. For example, in heave, the ram assembly means on one side of the vehicle tries to contract, while the other tries to extend. As the first chambers of the ram assembly means are interconnected, and the second chambers of the ram assembly means are interconnected, fluid is transferred from one first chamber to the other, and from one second chamber to the other, thereby providing zero heave stiffness. In roll, both ram assembly means try to contract or both try to extend, thereby creating a hydraulic lock.

Figure 3:
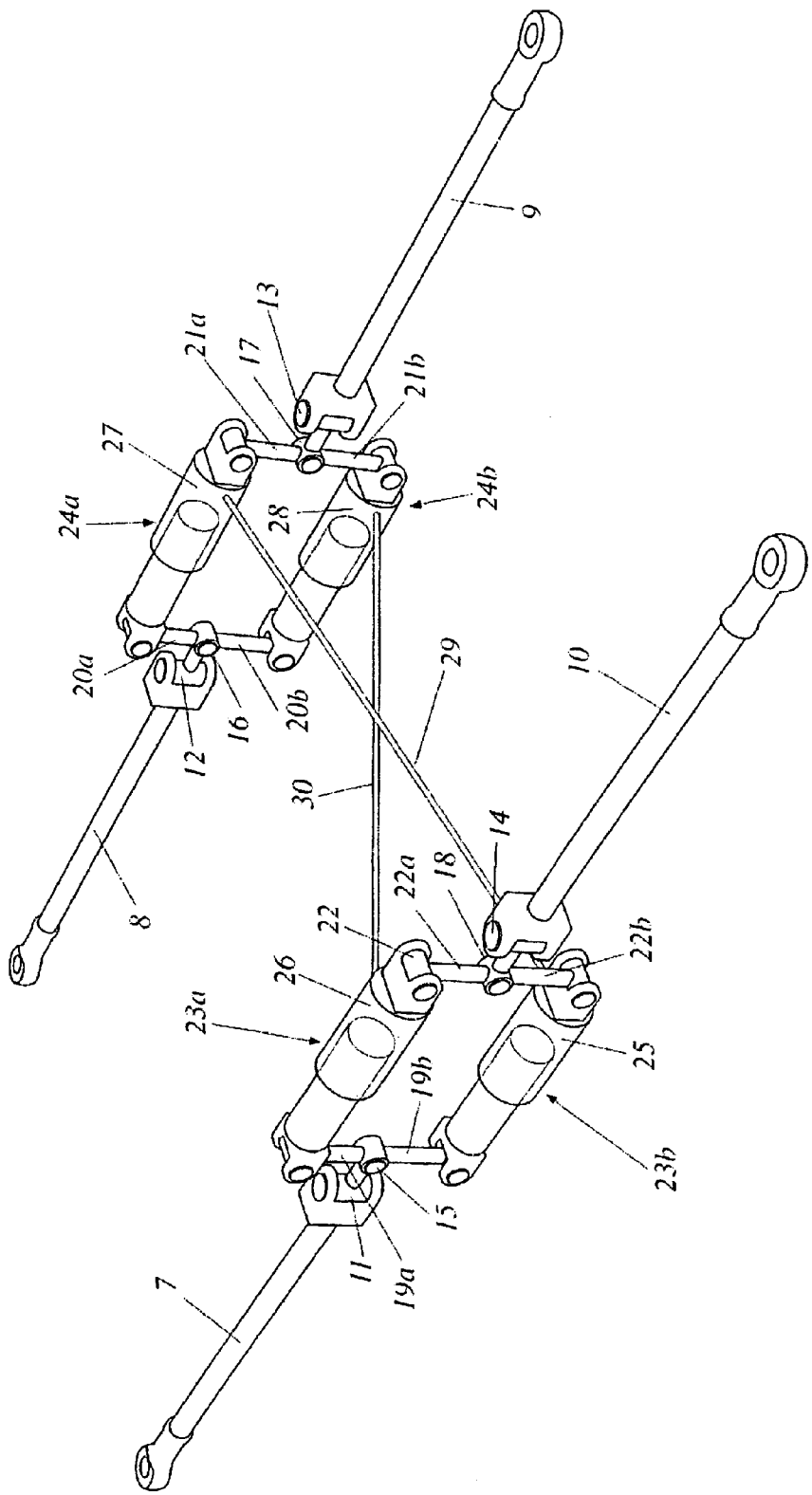
FIG. 3 is a schematic view of a second preferred embodiment of the vehicle suspension system according to the present invention.

It should be appreciated that, due to the very high forces required in the ram assembly means 23,24 to react the high roll moments of a laden trailer, the lever arms 19,20,21,22 may all be alike, each extending vertically both upwards and downwards. Then two double acting rams or preferably, two single acting rams can be used on each side of the vehicle. FIG. 3 therefore illustrates a detail view of the suspension system similar to FIG. 2, but including symmetrical lever arms extending both upwards (shown at 19a, 20a, 21a, 22a) and downwards (19b, 20b, 21b, 22b). The upper and lower portions of the lever arms and the pivotal fixings 15–18 between the suspension arms 7–10 and the body, may all be integrated and formed from one piece of material. Each pair of upper and lower rams 23a, 23b and 24a, 24b are analogous to the double acting rams 23, 24 in FIGS. 1 and 2, with the first chambers 25, 27 and the second chambers 26, 28 being correspondingly numbered. ie the upper ram 23a on the left side of the vehicle includes the second chamber 26 for that side of the vehicle, which is connected to the second chamber 28 of the lower ram 24b on the opposite side of the vehicle by conduit 30. This design allows for the highest strength components and/or lowest pressures in roll in the system for a given package width, ie between the tyres and chassis of a truck or trailer, where height is not so restricted.

The present invention may be simply adapted to vehicles other than large tandem axle vehicles. For example, in FIG. 4 there is shown another possible arrangement of the suspension system according to the present invention for an independent suspension vehicle. Here, for packaging reasons, to allow the ram assembly means to fit the envelope under the side sills of the vehicle, the lever arms 119,120, 121,122 all point generally downwards. Each ram assembly means comprises a central double acting roll ram 123,124, and a pair of single acting support rams 141,142,143,144 on opposing sides of each roll ram 123,124. The roll rams 123,124 can have through rods (not shown), or as shown, they can provide some support of the vehicle weight. The support rams provide the balance of the vehicle support and provide pitch stiffness, without providing roll or warp stiffness. The support rams do not have to be cross-linked, so may provide some roll/warp stiffness if required.

Figure 4:
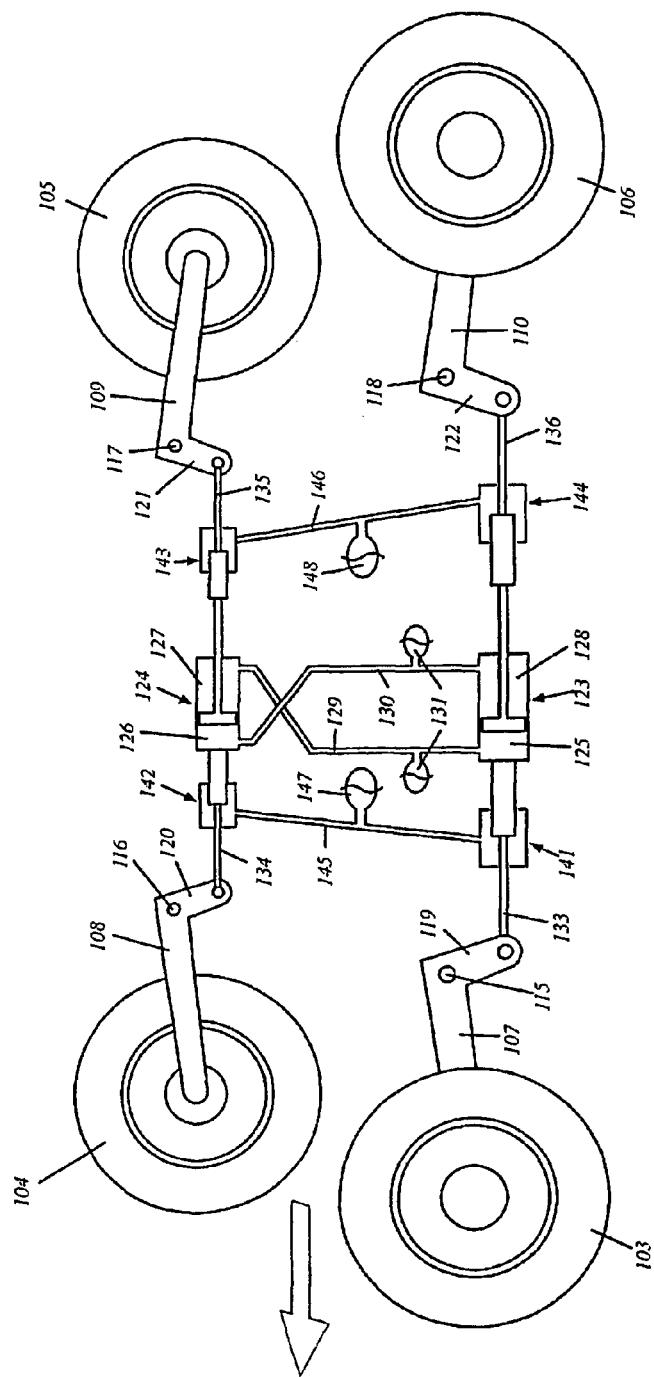
FIG. 4 is a schematic view of a trailing arm and leading arm vehicle suspension configuration showing a third preferred embodiment of the vehicle suspension system according to the present invention.
Figure 5:
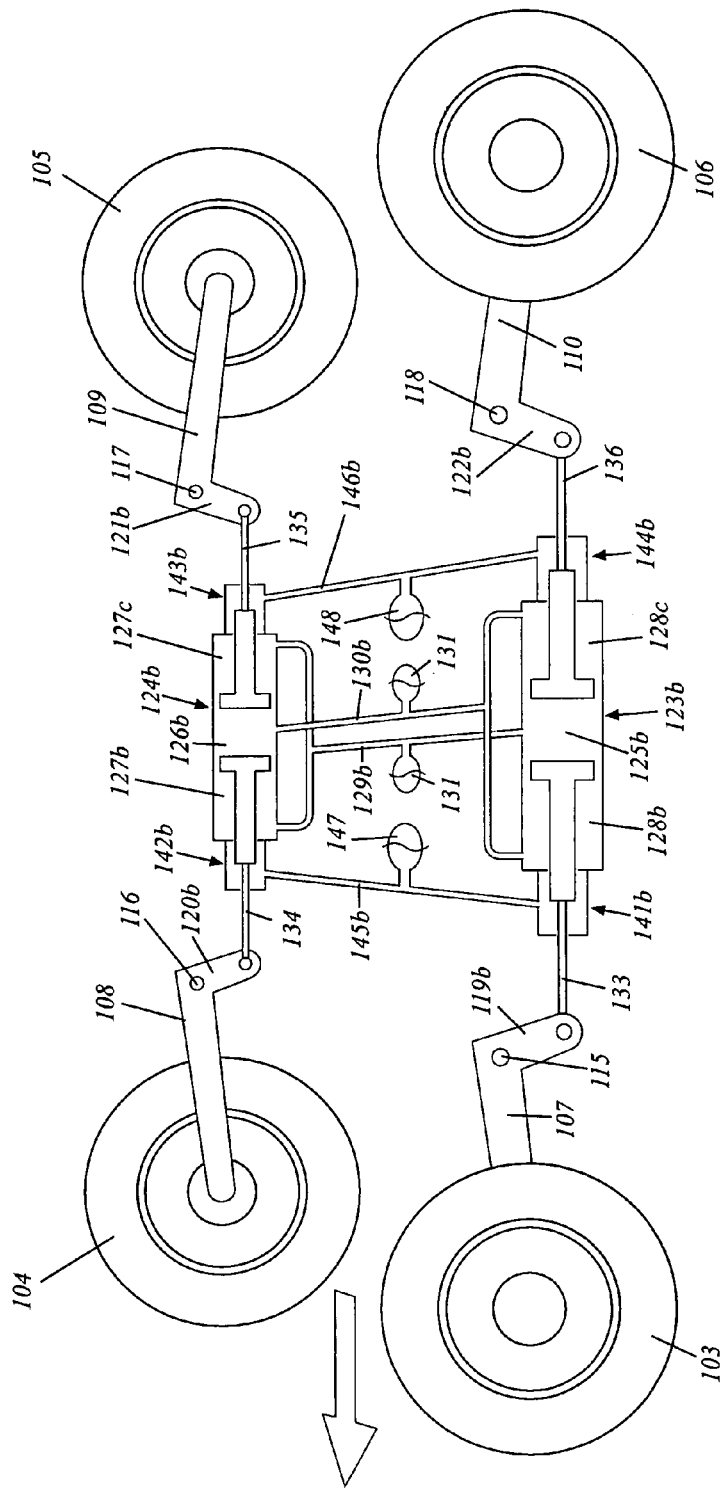
FIG. 5 is a schematic view of a trailing arm and leading arm vehicle suspension configuration showing a fourth preferred embodiment of the vehicle suspension system according to the present invention.

Looking in more detail at the suspension system shown in FIG. 4 and 5, the front left wheel 103 is located at least in part by a suspension arm 107, which is in turn pivotally connected by a bearing or bushing 115 to the vehicle body (not shown). Similarly, the front right wheel 104, rear right wheel 105 and rear left wheel 106 are located at least in part by a respective suspension arm 108, 109 and 110. The lever arm 119 associated with the front left wheel is rigidly fixed to the suspension arm 107, and rotates with the suspension arm about the body mount point 115. A corresponding arrangement is provided for the front right lever arm 120 which is rigidly fixed to the suspension arm 108 and rotates with the suspension arm about the body mount point 116, the rear right lever arm 121 being rigidly fixed to the suspension arm 109 and rotating with the suspension arm about the body mount point 117, and the rear left lever arm 122 being rigidly fixed to the suspension arm 110 and rotating with the suspension arm about the body mount point 118. Due to the wheelbase of the vehicle, connecting rods 133,134,135,136 interconnect the ram assemblies to the lever arms 119,120, 121,122. To prevent the ram assemblies vibrating, guides (not shown) may be fixed to the vehicle body which allow the rods to slide through and help prevent buckling of the rods when they are in compression. Additional joints may be used in the connecting rods to allow for misalignment during motion.

The central double acting roll rams 123, 124 shown are of unequal area, i.e. the effective piston area facing the first chambers 125, 126 is larger than the effective piston area facing the second chambers 127, 128. Therefore the roll rams 123, 124 as illustrated provide a heave stiffness in addition to the desired roll stiffness and the first chamber 125,126 of one roll ram must be connected to the second chamber 127,128 of the other roll ram by first and second conduits 129,130. The ratio of roll stiffness to heave stiffness is determined by the rod and bore relationship of the roll rams 123,124. Obviously it is possible to use a ram design having equal effective areas for the first and second chambers to remove the heave stiffness, leaving the roll rams 123, 124 providing only roll stiffness. It can be advantageous to use an arrangement as shown as it can provide a lowering of the vehicle in cornering. This happens due to the non-linearity of the hydropneumatic accumulators 131. The roll moment on the vehicle produces an approximately equal and opposite force change on the left and right roll ram, 123,124. The pressure in the accumulators therefore has to change to suit, with the one absorbing fluid at a decreasing rate and the other releasing fluid at an increasing rate. The sum of the fluid volume in the roll ram 123,124 is increased, displacing more rod out of the roll ram, and causing a lowering of the vehicle.

It can be desirable to provide all the vehicle heave and pitch stiffness within the single arrangement. This is what is illustrated in FIG. 4, in addition to the application of the system to an independent suspension. To this end, support rams 141,142,143,144 are provided, fixed to the vehicle body, with the piston rod of each support ram being respectively part of the connecting rod 133–136. The support rams are shown connected laterally across the vehicle by front and rear support conduits 145, 146, to interconnect the support rams for each pair of laterally spaced wheels. Resilience may be included in the fluid, the expansion of the conduits, or by accumulators 147, 148. The sizing of the roll and support rams and accumulators can be used to vary the roll, heave and pitch stiffness of the suspension.

Alternatively, the support rams for at least one laterally spaced pair of wheels may be individual for each wheel. Interconnecting all supports to give zero roll and warp stiffness can be desirable in some applications, but in other applications it can be preferable to have the support means for at least one pair of laterally spaced wheels, providing roll stiffness. Primarily, this can help with levelling and making component sizes similar front to rear when there is a significantly uneven roll moment distribution or lever ratio, front to rear. The support springs, if individual, may even be replaced by coil springs, ideally located longitudinally around the connecting rods and being connected to the body at their wheel ends, and actuated by plates fixed to the through connecting rods in much the same way as used by Citroën in the past on the Citroën 2CV™ model vehicle.

Although all the lever arms 119,120,121,122 associated with the wheels 103,104,105,106 are shown pointing generally downwards, for the preferred small vehicle package, they may alternatively all point substantially upwards to move the ram assembly up away from potential damage on rocks, etc. One significant advantage of using the configuration shown with the lever arms pointing downwards is that compression motions put the connecting rods in tension. This is of especial advantage when the connecting rods are also carrying vehicle support loads. Obviously the suspension arms can be substituted for any arrangement to transfer the cylinder lever arm force to a vertical wheel force.

Figure 4A:
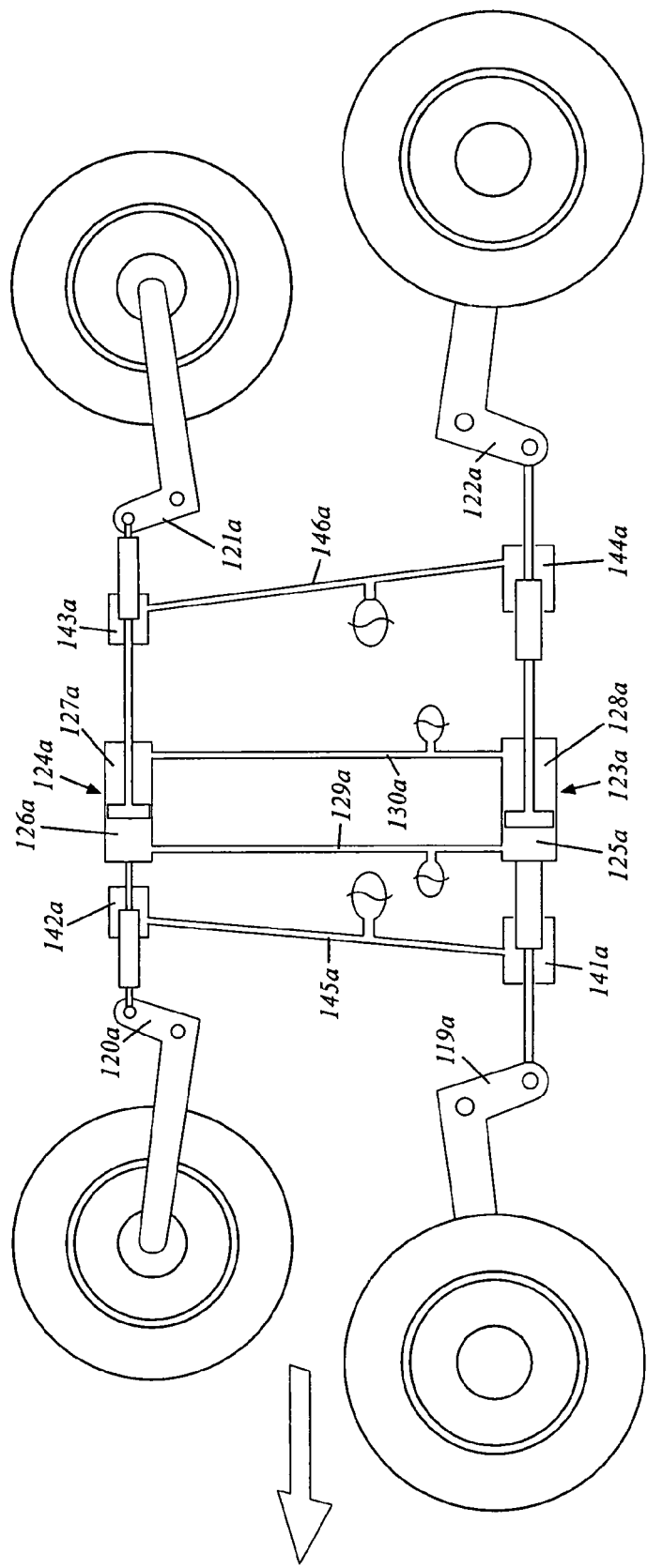
FIG. 4*a* is a schematic view of an alternative arrangement of the embodiment shown in FIG. 4.

FIG. 4a shows an alternative embodiment of the system shown in FIG. 4, wherein the lever arms 120a, 122a on the opposing vehicle side extend in a generally downward direction. The third 142a and fourth 143a fluid chambers provided by the single acting rams of one said ram assembly are respectively in fluid communication with the third 141a and fourth 144a fluid chambers of the single acting rams of the opposing said ram assembly via respective front and rear support conduits 145a, 146a. The double acting intermediate ram 123a, 124a, each with first and second fluid chambers 126a, 127a and 125a, 128a is located between and interconnects the respective pistons or cylinders of the respective single acting rams. The first chamber (125a, 126a) of each intermediate ram 123a, 124a are in fluid communication via the first fluid conduit 129a, and the second chamber (127a, 128a) of each said intermediate ram 127a, 128a are in fluid communication via the second fluid conduit 130a.

FIG. 5 shows a further preferred embodiment of the vehicle suspension system according to the present invention similar to the system shown in FIG. 4, but with the support rams 141b, 142b, 143b, 144b integrated into the roll rams 123b, 124b, reducing the number of high pressure to atmosphere seals, and therefore the friction and possible oil leak paths. Corresponding reference numerals have therefore been used for corresponding features. The functionality is exactly the same, despite the different appearance of the roll rams in the centre of the ram assembly. Two pistons in each ram assembly are used and the body of each ram assembly is fixed to the vehicle body. Each ram assembly 123b, 124b may have a central fluid chamber 125b, 126b corresponding to the first chamber of the ram assembly shown in FIG. 4, and two opposing side chambers 127b, 127c and 128b, 128c corresponding to the second chamber of FIG. 4. The two side chambers 128b, 128c of the left ram assembly are interconnected via conduit 129b to each other and to the central chamber 126b of the ram assembly on the opposite side of the vehicle. The two side chambers 127b, 127c of the right ram assembly are interconnected via conduit 130b to each other and to the middle chamber 125b of the ram assembly on the opposite side of the vehicle. The support rams are shown connected laterally across the vehicle by front and rear support conduits 145b, 146b, to interconnect the support rams for each pair of laterally spaced wheels.

The invention claimed is:

1. A suspension system for a vehicle having a body and at least one pair of forward wheel assemblies and one pair of rearward wheel assemblies, each wheel assembly including at least one wheel, the suspension system including:
a suspension arm for each wheel assembly providing at least partial location of the respective wheel assembly, the suspension arm of each forward wheel assembly being pivotally mounted to the vehicle body at a pivot position rearward of an axle line of the respective forward wheel assemblies, the suspension arm of each rearward wheel assembly being pivotally mounted to the vehicle body at a pivot position forward of an axle line of the respective rearward wheel assemblies;
at least one lever arm moving in conjunction with and extending radially from the pivot position of each said suspension arm;
wherein at each side of the vehicle, a ram assembly is located between the lever arms of the respective forward and rearward wheel assemblies, each ram assembly including at least a first and second variable volume fluid chamber, each fluid chamber being in fluid communication with a fluid chamber of an opposing ram assembly provided on an opposing side of the vehicle, such that there is fluid flow between the chambers of the ram assemblies during heave motion of the vehicle, there is little to no fluid flow between the chambers of the ram assemblies during roll motions, and there is an at least substantially longitudinal motion of the ram assemblies with little to no flow of fluid between the chambers of the ram assemblies during cross axle articulation motion of the wheel assemblies.

2. A suspension system according to claim 1, wherein each ram assembly includes a single double acting ram having a cylinder separated into said first and second fluid chambers by a piston located therein, the lever arm of one of the wheel assemblies being interconnected with the cylinder of a respective ram, the lever arm of the other wheel assemblies on the same vehicle side being interconnected with the piston of the respective ram, such that motion of the lever arms relative to each other results in movement of the piston within the cylinder of the respective ram.

3. A suspension system according to claim 2, wherein the lever arms on one vehicle side extend in a generally upward direction, while the lever arms on the opposing side of the vehicle extend in a generally downward direction, the first fluid chamber of the double acting rams on opposing sides of the vehicle being in fluid communication, and the second fluid chambers of said two double acting rams being in fluid communication.

4. A suspension system according to claim 2, wherein the lever arms on both sides of the vehicle extend in the same general upward or downward direction, the first fluid chamber of each said double acting ram being in fluid communication with the second fluid chamber of the double acting ram on an opposing vehicle side.

5. A suspension system according to claim 2, wherein the fluid chambers of each double acting ram have at least substantially equal effective areas.

6. A suspension system according to claim 1, wherein each ram assembly includes a pair of single-acting roll control rams, each of the lever arms on both sides of the vehicle having portions extending in both upward and downward directions, one upper single-acting roll control ram is located between upwards extending lever arm portions of the forward and rearward wheel assemblies, and one lower single-acting roll control ram is located between downwards extending lever arm portions of the forward and rearward wheel assemblies, the upper single-acting roll control ram on one side of the vehicle including one said first fluid chamber and the lower single-acting roll control ram on the same side of the vehicle including one said second fluid chamber, on the opposite side of the vehicle the upper single-acting roll control ram includes another said second fluid chamber and the lower single-acting roll control ram includes another said first fluid chamber, the first fluid chamber of the ram assembly on one side of the vehicle being connected to the first fluid chamber on the opposite side of the vehicle and the second fluid chamber of the ram assembly on one side of the vehicle being connected to the second fluid chamber on the opposite side of the vehicle.

7. A suspension system according to claim 1, wherein each ram assembly includes a series of interconnected rams including a pair of single acting support rams and an intermediate ram,
each single acting ram including a cylinder and piston supported therein, each pair of single acting support rams thereby respectively providing a third and a fourth fluid chamber, the intermediate ram of each ram assembly being a double acting ram including one of the first and one of the second fluid chambers, each respective intermediate ram being located between the respective pair of single acting rams and interconnecting the respective piston or cylinder of each of the single acting rams of the respective pair, the piston or cylinder of the two single acting rams being respectively interconnected to the piston and cylinder of the intermediate ram.

8. A suspension system according to claim 7, wherein the lever arms on both sides of the vehicle extend in the same general direction, the third and fourth fluid chambers provided by the single acting rams of one said ram assembly are respectively in fluid communication with the third and fourth fluid chambers of the single acting rams of the ram assembly on the opposing side of the vehicle, and the first chamber of each said intermediate ram is in fluid communication with the second chamber of the intermediate ram on the opposing side of the vehicle.

9. A suspension system according to claim 7, wherein the lever arms on one side of the vehicle extend in a generally upward direction, while the lever arms on the opposing side of the vehicle extend in a generally downward direction, the third and fourth fluid chambers provided by the single acting rams of one said ram assembly are respectively in fluid communication with the third and fourth fluid chambers of the single acting rams of the ram assembly on the opposing side of the vehicle, the first chambers of each said intermediate ram are in fluid communication, and the second chambers of each said intermediate ram are in fluid communication.

10. A suspension system according to claim 1, wherein each ram assembly includes a single piston cylinder accommodating a pair of pistons, each piston having a piston rod extending therefrom, the piston cylinder being thereby separated into three fluid chambers including a central fluid chamber, and side fluid chambers on opposite sides of the central fluid chamber, the pistons of the ram assembly on one side of the vehicle being respectively interconnected with the lever arms of the respective forward and rearward wheel assemblies on one side of the vehicle, the pistons of each ram assembly on the opposing side of the vehicle being respectively interconnected with the lever arms of the respective forward and rearward wheel assemblies on the said opposing side of the vehicle, and each ram assembly further includes a pair of rod cylinders provided on opposing sides of the piston cylinder, each respective rod cylinder accommodating a respective piston rod, each rod cylinder providing a rod fluid chamber, the volume of which varies depending on the length of the piston rod accommodated therein at any particular time, the rod fluid chambers of each pair of rod cylinders thereby respectively providing a third and a fourth fluid chamber.

11. A suspension system according to claim 10, wherein the lever arms extend in the same general direction, and the central fluid chamber of one ram assembly is in fluid communication with the side fluid chambers of the other ram assembly on the other side of the vehicle, the respective third fluid chambers are in fluid communication, and the respective fourth fluid chambers are in fluid communication.

* * * * *